United States Patent [19]

Evans

[11] Patent Number: 4,572,123
[45] Date of Patent: Feb. 25, 1986

[54] INTERNAL COMBUSTION ENGINE SQUISH JET COMBUSTION CHAMBER

[75] Inventor: Robert L. Evans, West Vancouver, Canada

[73] Assignee: The University of British Columbia, Vancouver, Canada

[21] Appl. No.: 623,740

[22] Filed: Jun. 22, 1984

[51] Int. Cl.⁴ .............................................. F02F 3/28
[52] U.S. Cl. ...................... 123/262; 123/263; 123/193 P; 123/661
[58] Field of Search ............... 123/262, 279, 293, 276, 123/193 P, 250, 263, 299, 300, 1 A, 661, 657, 662, 667

[56] References Cited

U.S. PATENT DOCUMENTS

| | | | |
|---|---|---|---|
| 2,133,478 | 10/1938 | Schlaefke | 123/293 |
| 2,505,999 | 5/1950 | Smith | 123/262 |
| 2,738,782 | 3/1956 | Bodine, Jr. | 123/193 P |
| 3,195,520 | 7/1965 | Simko | 123/263 |
| 4,009,702 | 3/1977 | Mayer | 123/193 P |
| 4,166,436 | 9/1979 | Yamakawa | 123/262 |

FOREIGN PATENT DOCUMENTS

| | | | |
|---|---|---|---|
| 1287172 | 4/1960 | France | 123/262 |
| 0042505 | 4/1979 | Japan | 123/661 |
| 0056616 | 4/1982 | Japan | 123/262 |
| 100453 | 10/1940 | Sweden | 123/661 |
| 475179 | 2/1936 | United Kingdom | 123/262 |

Primary Examiner—Raymond A. Nelli
Attorney, Agent, or Firm—Townsend and Townsend

[57] ABSTRACT

A squish jet arrangement for an internal combustion engine is positioned on a piston member or cylinder head member thereof. A substantially cylindrical bowl opens onto the face of the member. At least one pair, and preferably a plurality of pairs, of squish jet passages are arranged to direct flows of gasses tangentially into the bowl. As first ones of the pairs of squish jet passages lie in a lower transverse plane than second ones of the pairs, a counter-rotating, bi-level swirl can be produced by the squish jet outlets. A squish jet arrangement is also provided with outlets of squish jet passages spaced above a lower surface of a bowl, and directed to eject coplanar flows of gasses therefrom, which intercept one another.

32 Claims, 5 Drawing Figures

INTERNAL COMBUSTION ENGINE SQUISH JET COMBUSTION CHAMBER

FIELD OF THE INVENTION

This invention relates to a squish jet combustion chamber for use in internal combustion engines.

DESCRIPTION OF PRIOR ART

It is well known in the art of internal combustion engines to attempt to increase the rate of mixing of an air fuel mixture in the combustion chamber, immediately prior to and during the initial stages of combustion. Such an increased rate of mixing and turbulence tends to increase the rate of combustion of the mixture, resulting in increased engine efficiency as well as lower levels of exhaust pollutents. One known means for increasing the rate of such mixing and turbulence is a squish jet or equivalent arrangement. Such arrangements are disclosed for example in U.S. Pat. No. 4,195,597 to Hofbauer et al, U.S. Pat. No. 4,191,136 to Matsumoto, U.S. Pat. No. 3,132,633 to Zimmerman, U.S. Pat. No. 1,759,161 to Lang (this arrangement basically appearing to be a reverse-squish arrangement), and U.S. Pat. No. 2,505,999 to Smith. Such arrangements have in the past also included particular means to cause swirling of the gas and fuel mixture within the combustion chamber. Examples of such arrangements are shown in the Hofbauer et al previously mentioned, as well as in U.S. Pat. Nos. 4,166,436 to Yamakawa and 3,152,523 to Whitfield et al (in particular, FIG. 6 thereof). There is apparently no previous arrangment though, whereby a counter-rotating, bi-level swirl of gas/fuel mixture is produced. In addition, there has apparently been no prior disclosure of squish jet arrangements wherein the flows of gasses from the squish jets intercept one another above a lower surface of a bowl, and are coplanar which include provision for enhancing mixing of the air/fuel mixture afjacent the lower surface of a squish jet bowl.

SUMMARY OF THE INVENTION

The present invention provides a piston member or cylinder head member, which has a substantially cylindrical bowl opening onto the face of the member. A pair of squish jet passages are further provided, which have respective inlets communicating with the face of the member. The pair also has respective, transversely spaced, outlets directed substantially tangentially into the bowl. The outlet of the first one of the pair is directed upwardly, and the outlet of a second one of the pair is directed downwardly from a position above the outlet of the first one. By such an arrangement, a counter-rotating, bi-level swirl of air/fuel mxture can be produced in the bowl by the squish jet outlets.

The member as described preferably has a plurality of pairs of such squish jet passages, each pair being constructed as described. In such case, the outlets of the first ones and second ones of the pairs of squish jet passages, lie in respective lower and upper parallel, transverse planes. Preferably, the outlets of the pair of squish jets are transversely opposed. That is, they are opposed as viewed on a transverse plane from above, but not directly opposed when viewed on a vertical plane.

The outlets of the first and second ones of the squish jet passages of each pair, are preferably adjacent to and directed substantially orthogonally to, outlets of the second and first ones, respectively, of other pairs of the squish jet passages. Further, the bowl is preferably disposed centrally in the face of the member. In the latter case the squish jet passages may also be of equal length, with the inlets of the squish jet passages being equally spaced apart on a circle concentric with the opening of the bowl. A particularly preferred number of pairs of squish jet passages, is four pairs.

Again, the piston member or cylinder head member, may be provided with a bowl opening onto the face of it. In this case, a plurality of squish jet passages are provided with respective inlets communicating with the face of the member, and respective transversely spaced outlets spaced above a lower surface of the bowl and directed into the bowl. The arrangement is also such that flows of gases ejected from the outlets are substantially coplanar and intercept one another above the lower surface of the bowl. Preferably, the outlets of the squish jet passages are symmetrically spaced apart and arranged, so that the flows of gasses ejected therefrom are on the same radial plane.

The bowl is usefully cylindrical and disposed centrally on the face of the member, with the squish jet passages being of equal length and the inlets thereof being equaly spaced apart on a circle concentric with the opening of the bowl. A dimple having downsloping, and preferably downcurving, sides, may usefully extend upwardly from the lower surface of the bowl. This dimple has a maximum height such that an upper end of the dimple is adjacent a lower end of the flows of gasses at the point of interception thereof, so that the dimple directs gasses at the point of interception downwardly. Preferably, the outlets of the squish jet passages are angularly symmetrically spaced apart about the dimple so that flows of gasses ejected therefrom are on the same radial plane.

DRAWINGS

Embodiments of the invention will now be described with reference to the drawings, in which.

DETAILED DESCRIPTION OF EMBODIMENTS OF THE INVENTION

Figure 1:
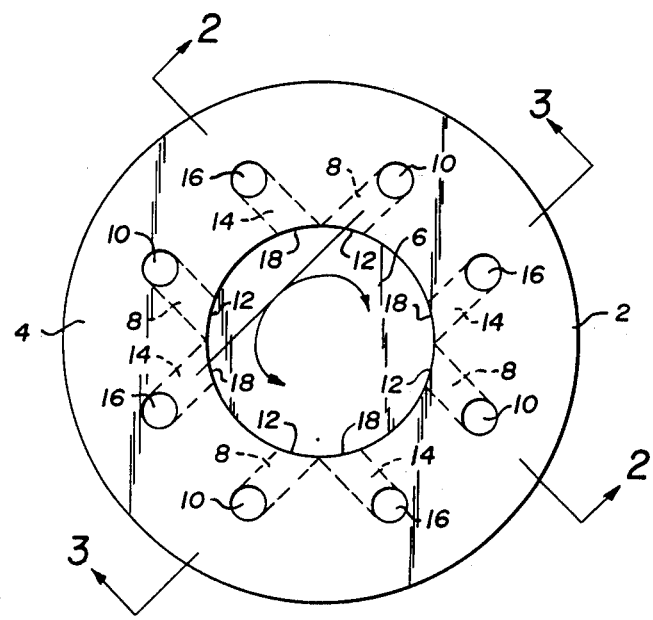
FIG. 1 is a plan view of a squish jet arrangement of the present invention.
Figure 2:
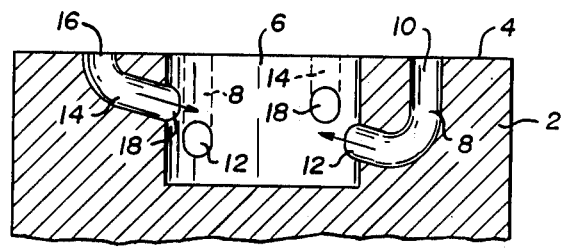
FIG. 2 is a vertical cross section along the line 2—2 of FIG. 1.
Figure 3:
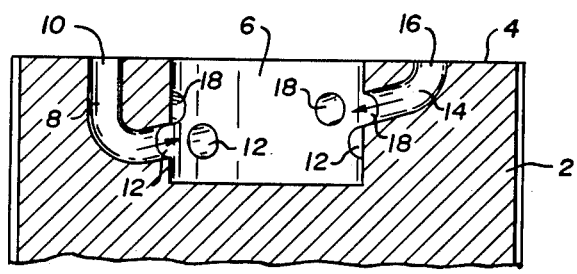
FIG. 3 is a vertical cross section along the line 3—3 of FIG. 1.

Referring to FIGS. 1 through 3, a member 2, which could either be a piston, or a portion of a cylinder head, is shown. A substantially cylindrical bowl 6 is positioned in the center of member 2 and opens onto the face 4 thereof. A plurality of pairs of squish jet passages are provided in member 2, each pair consisting of a squish jet passage 8 and a squish jet passage 14. All of the squish jet passages 8, 14 are of equal length, and have respective inlets 10 and 16, communicating with the face 4 of member 2, and equally spaced apart on a circle concentric with the opening of bowl 6. The passages of each pair 8, 14 have respective, transversely opposed outlets 12, 18 directed substantially tangentially into the bowl. By "transversely opposed" is meant that when the outlets are viewed from a plane from above as in FIG. 1, they appear to be opposing one another, however this is not the case when viewed on a vertical plane as in FIGS. 2 and 3. The outlet 12 of the first one 8 of each pair 8, 14 is directed upwardly, while the outlet 18 of a second one 14 of each pair 8, 14, is directed downwardly. In addition, as is most apparent from FIG. 1, the outlets 12 of the first ones of pairs 8, 14, and outlets 18 of second ones 18 of pairs 8, 14, are adjacent to, and directed substantially orthogonally to, outlets 18 of the second ones 14 and outlets 12 of the first ones 8, respectively, of the pairs of squish jet passages 8, 14. Further, as is most apparent from FIGS. 2 and 3, the outlets 12 of first ones 8, and the outlets 18 of the second ones 14, of the pairs 8, 14, lie in respective lower and upper parallel, transverse planes.

The result of the arrangement shown in FIG. 1 through 3 can understood if it is assumed that member 2 for the moment is a piston in a typical 4-stroke gasoline internal combustion engine. Then, as piston 2 moves toward TDC, the air/fuel mixture which is compressed in a squish volume between the piston face 4 and cylinder head, is forced through squish jet passages 8, 14, and out through respective outlets 12, 18. The result of the foregoing is the creation of a plurality of counter-rotating, bi-level swirls, as for example the ones shown with the arrows in FIG. 1. The result is swirling helical flows of gas which are opposite one another in direction, therby generating strong shear flow resulting in creation of high intensity small-scale turbulence in bowl 6, and hence fairly rapid and effective mixing of the air/fuel mixture. Of course, the arrangement shown FIG. 1 through 3 would work equally well if member 2 is a cylinder head. Provision of course would have to be made for valves, spark plugs, and other well known components of a typical internal combustion engine (which of course, could include a diesel engine, and a 2 or 4 cycle engine).

Figure 4:
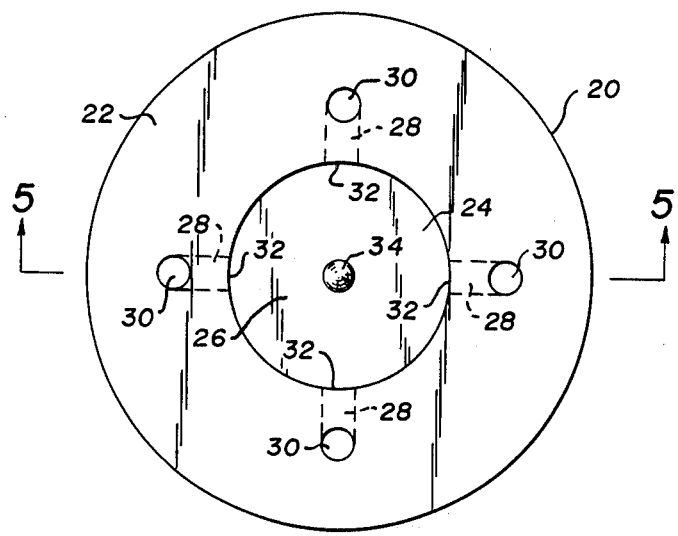
FIG. 4 is a plan view of another squish jet arrangement of the present invention.
Figure 5:
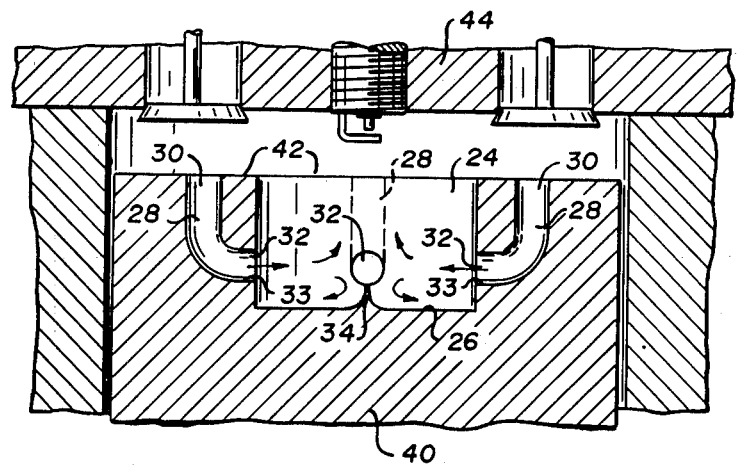
FIG. 5 is a vertical cross section of a portion of an internal combustion engine wherein the piston utilizes the squish jet arrangement of FIG. 4, which arrangement is viewed along the line 5—5 of FIG. 4.

Referring now to FIGS. 4 and 5, member 20, which in FIG. 5 is piston 40, is provided with a cylindrical bowl 24 disposed centrally on the face 22 of member 20 (or face 42 of piston 40 in FIG. 5). Four squish jet passages 28, all of equal length, have respective inlets 30 communicating with the face 22 of member 20, or 42 of piston 40. Inlets 30 are spaced apart on a circle concentric with the opening of bowl 24. Squish jet passages 28 further have coplanar outlets 32 directed into the bowl and symmetrically spaced thereabout, that is, they are spaced equal distances apart as well as equal angles apart (the latter condition being referred to as "angularly symmetric"). The outlets are also spaced above a lower surface 26 of the bowl 24. The foregoing arrangement is such that flows of gasses can be ejected from outlets 32 in directions coplanar therewith, as for example shown in FIG. 5, to intercept one another, and thereby promote mixing and turbulence. The flows of gasses will of course be in the same radial plane, that is in a plane substantially perpendicular to the direction of travel of the piston.

A dimple 34 is provided which has downcurving sides, and which extends upwardly from the center of the lower surface 26 of the bowl 24. Dimple 34 is of a height substantially equal to the distance between the lower surface 26 of bowl 24 and lowermost ends 33 of outlets 32. By virtue of the foregoing arrangement, dimple 34 downwardly directs gasses from outlets 33 which are intercepting adjacent the central axes of bowl 24 and dimple 34. Thus, dimple 34 aides in the break up of such flows of gasses. The foregoing flow of gasses occur of course as the piston in an internal combustion engine having such a squish jet arrangement in the piston or cylinder thereof, approaches TDC. The highly turbulent mixture is then ignited by a spark plug near TDC, and the piston begins to move back down the cylinder. As the piston moves down, a reverse-squish process takes place drawing enflamed mixture up through squish jet passages 28, and into a squish region between the face 22 of member 20, and the face of the other member, that is in FIG. 5, between face 42 of piston 40, and face 46 of a cylinder head 44. Such reverse squish movement aides in ignition of unburned mixture in the squish volume, and provides more complete combustion than would otherwise be possible.

An advantage of the arrangements described compared to combustion chambers utilizing swirl in the entire combustion chamber to promote turbulence, is that the squish jet turbulence in the former arrangements is generated near TDC, when such turbulence is most effective in promoting lean combustion. In contrast, swirl generated turbulence produced in the entire combustion chamber, generally decays substantially before TDC. Another advantage of the arrangements described, is that turbulence is confined largely to the center of the combustion chamber, rather than at the walls, thereby minimizing the effects of increased heat transfer to the walls.

It will be appreciated that although the squish jet arrangements above have been described particularly in relation to a gasoline internal combustion engine, they may also be usefully applied to diesel engines. Other possible modifications include the possibility of having a bowl of non-circular transverse cross-section, and which may not be disposed centrally on the face of the member. In addition, the squish jet passage inlets may not necessarily be concentric with the opening of the bowl.

As will be apparent to those skilled in the art in light of the foregoing disclosure, many further alterations and modifications are possible in the practice of this invention without departing from the spirit of scope thereof. Accordingly, the scope of the invention is to be construed in accordance with the substance defined by the following claims.

I claim:

1. An internal combustion engine block having a piston and cylinder head, one of which has:
   (a) a substantially cylindrical bowl opening into the face thereof;
   (b) a pair of squish jet passages having respective inlets communicating with the face thereof, and respective, transversely spaced, outlets directed substantially tangentially into the bowl, the outlet of a first one of the pair being directed upwardly, and the outlet of second one of the pair being directed downwardly from a position above the outlet of the first one, so that a counter-rotating, bi-level swirl can be produced in the bowl by the squish jet outlets.

2. An internal combustion engine block as described in claim 1 wherein said one of the piston and cylinder head has a plurality of pairs of squish jet passages, each pair as described, the outlets of the first ones and the second ones of the pairs being in respective lower and upper parallel transverse planes.

3. An internal combustion engine block as described in claim 2 wherein the outlets of the pair are transversely opposed.

4. An internal combustion engine block as described in claim 3 wherein the outlets of the first and second ones of the squish jet passages of each pair, are adjacent to, and directed substantially orthogonally to, outlets of the second and first ones, respectively, of other pairs of the squish jet passages.

5. An internal combustion engine block as described in claim 4 wherein the bowl is disposed centrally in the face of said one, and wherein said squish jet passages are of equal length with the inlets of the squish jet passages being equally spaced apart on a circle concentric with the opening of the bowl.

6. An internal combustion engine block as described in claim 5 wherein said one has four pairs of squish jet passages.

7. A piston having:
(a) A substantially cylindrical bowl opening into the face thereof:
(b) a pair of squish jet passages having respective inlets communicating with the face thereof, and respective, transversely spaced, outlets directed substantially tangentially into the bowl, the outlet of a first one of the pair being directed upwardly, and the outlet of a second one of the pair being directed downwardly from a position above the outlet of the first one, so that a counter-rotating, bi-level swirl can be produced in the bowl by the squish jet outlets.

8. A piston as described in claim 7 wherein the outlets of the pair are transversely opposed.

9. A piston as described in claim 8 wherein the outlets of the first and second ones of the squish jet passages of each pair, are adjacent to, and directed substantially orthogonally to, outlets of the second and first ones, respectively, of other pairs of the squish jet passages.

10. A piston having:
(a) a substantially cylindrical bowl disposed centrally in the face of the piston;
(b) a plurality of pairs of squish jet passages of equal length, and having respective inlets communicating with the face of the piston and equally spaced apart on a circle concentric with the opening of the bowl, the passages of each pair having respective, transversely opposed outlets directed substantially tangentially into the bowl, with the outlet of a first one of each pair being directed upwardly, and the outlet of a second one of each pair being directed downwardly, the outlets of the first and second ones of each pair being adjacent to, and directed substantially orthogonally to, outlets of the second and first ones, respectively, of other pairs of the squish jet passages, and the outlets of the first ones and second ones of the pairs being in respective lower and upper parallel transverse planes, so that a counter-rotating bi-level swirl can be produced in the bowl by the squish jet passages.

11. A cylinder head having:
(a) a substantially cylindrical bowl opening into the face thereof;
(b) a pair of squish jet passages having respective inlets communicating with the face thereof, and respective, transversely spaced, outlets directed substantially tangentially into the bowl, the outlet of a first one of the pair being directed upwardly, and the outlet of a second one of the pair being directed downwardly from a position above the outlet of the first one, so that a counter-rotating, bi-level swirl can be produced in the bowl by the squish jet outlets.

12. A cylinder head described in claim 11 wherein the outlets of the pair are transversely opposed.

13. A cylinder head as described in claim 12 wherein the outlets of the first and second ones of the squish jet passages of each pair, are adjacent to, and directed substantially orthogonally to, outlets of the second and first ones, respectively, of other pairs of the squish jet passages.

14. A cylinder head having:
(a) a substantially cylindrical bowl disposed centrally in the face of the cylinder head:
(b) a plurality of pairs of squish jet passages of equal length, and having respective inlets communicating with the face of the cylinder head and equally spaced apart on a circle concentric with the opening of the bowl, the passages of each pair having respective, transversely opposed outlets directed substantially tangentially into the bowl, with the outlet of a first one of each pair being directed upwardly, and the outlet of a second one of each pair being directed downwardly, the outlets of the first and second ones of each pair being adjacent to, and directed substantially orthogonally to, outlets of the second and first ones, respectively, of other pairs of the squish jet passages, and the outlets of the first ones and second ones of the pairs being in respective lower and upper parallel transverse planes, so that a counter-rotating bi-level swirl can be produced in the bowl by the squish jet passages.

15. A piston as described in claim 10 which has four pairs of squish jet passages.

16. A cylinder head as described in claim 14 which has four pairs of squish jet passages.

17. A internal combustion engine block having a piston and cylinder head, one of which has:
(a) a bowl opening onto the face thereof:
(b) a plurality of squish jet passages having respective inlets disposed at spaced apart positions on the face thereof, and respective transversely spaced outlets above a lower surface of the bowl and directed into the bowl, so that flows of gasses ejected therefrom are substantially coplanar and intercept one another above the lower surface of the bowl the other one of the piston and cylinder head being shaped so that as the piston approaches top dead center, gasses are forced through the inlets of the squish jet passages, to be ejected from the outlets thereof.

18. An internal combustion engine block as described in claim 17 wherein the outlets of the squish jet passages are symmetrically spaced apart and arranged so that the flows of gasses ejected therefrom are on the same radial plane.

19. An internal combustion engine block as described in claim 18 wherein the bowl is cylindrical and disposed centrally in the face of said one, and the squish jet passages are of equal length with the inlets thereof being equally spaced apart on a circle concentric with the opening of the bowl.

20. A piston having:
(a) a bowl opening onto the face thereof;
(b) a plurality of squish jet passages having respective inlets disposed at spaced apart positions on the face thereof, and respective transversely spaced outlets spaced above a lower surface of the bowl and directed into the bowl, so that flows of gasses ejected therefrom are substantially coplanar and intercept one another above the lower surface of the bowl.

21. An internal combustion engine block as described in 14 wherein the outlets of the squish jet passages are symmetrically spaced apart and arranged so that the flows of gasses ejected therefrom are on the same radial plane.

22. An internal combustion engine block as described in claim 21 wherein the bowl is cylindrical and disposed centrally in the face of said one, the squish jet passages are of equal length with the inlets thereof being equally spaced apart on a circle concentric with the opening of the bowl.

23. A cylinder head having:
 (a) a bowl opening onto the face thereof;
 (b) a plurality of squish jet passages having respective inlets disposed at spaced apart positions on the face thereof, and respective transversely spaced outlets spaced above a lower surface of the bowl and directed into the bowl, so that flows of gasses ejected therefrom are substantially coplanar and intercept one another above the lower surface of the bowl.

24. A cylinder head as described in claim 23 wherein the outlets of the squish jet passages are symmetrically spaced apart and arranged so that the flows of gasses ejected therefrom are on the same readial plane.

25. A cylinder head as described in claim 24 wherein the bowl is cylindrical and disposed centrally in the face of the cylinder head, and the squish jet passages are of equal length with the inlets thereof being equally spaced apart on a circle concentric with the opening of the bowl.

26. An internal combustion engine block as described in claim 17 additionally comprising a dimple having downsloping sides, extending upwardly from the lower surface of the bowl, and having a maximum height such that an upper end of said simple is adjacent a lower end of the flows of gasses at the point of interception, and the dimple directs gasses thereat downwardly.

27. An internal combustion engine block as described in claim 26 wherein the outlets of the squish jet passages are angularly symmetrically spaced apart about said dimple, and arranged so that the flows of gasses ejected therefrom are on the same radial plane.

28. An internal combustion engine block as described in claim 27 wherein the bowl is cylindrical and disposed centrally in the face of said one, and the squish jet passages are of equal length with the inlets thereof being equally spaced apart on a circle concentric with the opening of the bowl.

29. A piston as described in claim 20 additionally comprising a dimple having downcurving sides, extending upwardly from the lower surface of the bowl, and having a maximum height such that an upper end of said dimple is adjacent a lower end of the flows of gasses at the point of interception, and the dimple directs gasses thereat downwardly.

30. A piston as described in claim 29 wherein the outlets of the squish jet passages are angularly symmetrically spaced apart about said dimple, and arranged so that the flows of gasses ejected therefrom are on the same radial plane.

31. A cylinder head as described in claim 23 additionally comprising a dimple having downcurving sides, extending upwardly from the lower surface of the bowl, and having a maximum height such that an upper end of said dimple is adjacent a lower end of the flows of gasses at the point of interception, and the dimple directs gasses thereat downwardly.

32. A cylinder head as described in claim 31 wherein the outlets of the squish jet passages are angularly symmetrically spaced apart about said dimple, and arranged so that the flows of gasses ejected therefrom are on the same radial plane.

* * * * *